April 7, 1959 C. BRAMMING 2,880,899
VACUUM BOTTLES WITH SUSPENDED FILLERS
Filed Sept. 10, 1956 2 Sheets-Sheet 1
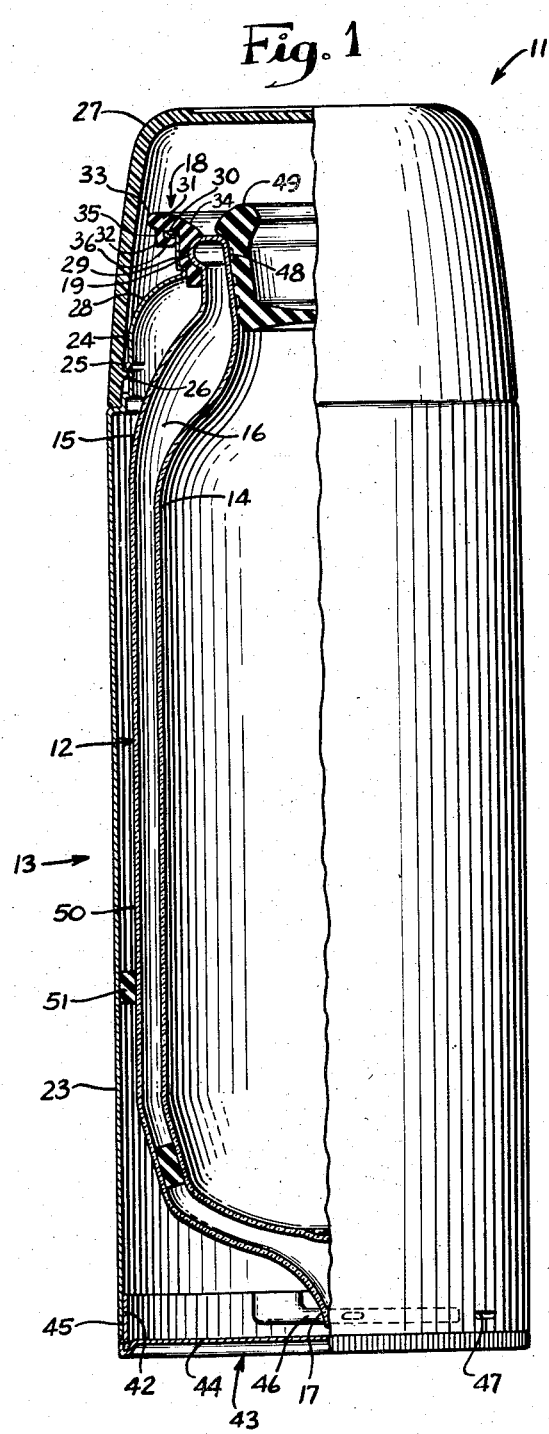
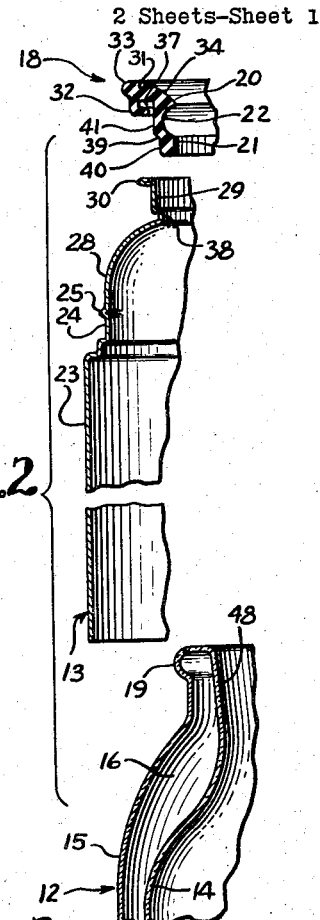
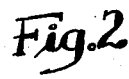
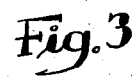
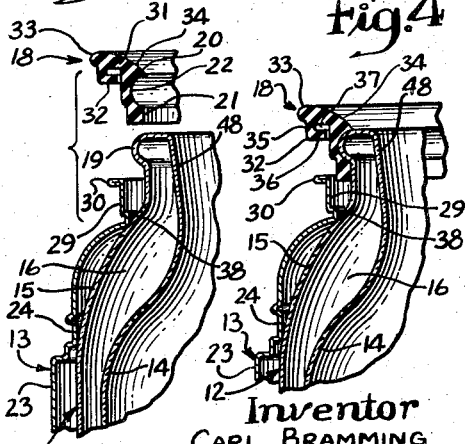
Inventor
CARL BRAMMING
by: Ooms, McDougall, Williams & Hersh
Attys.

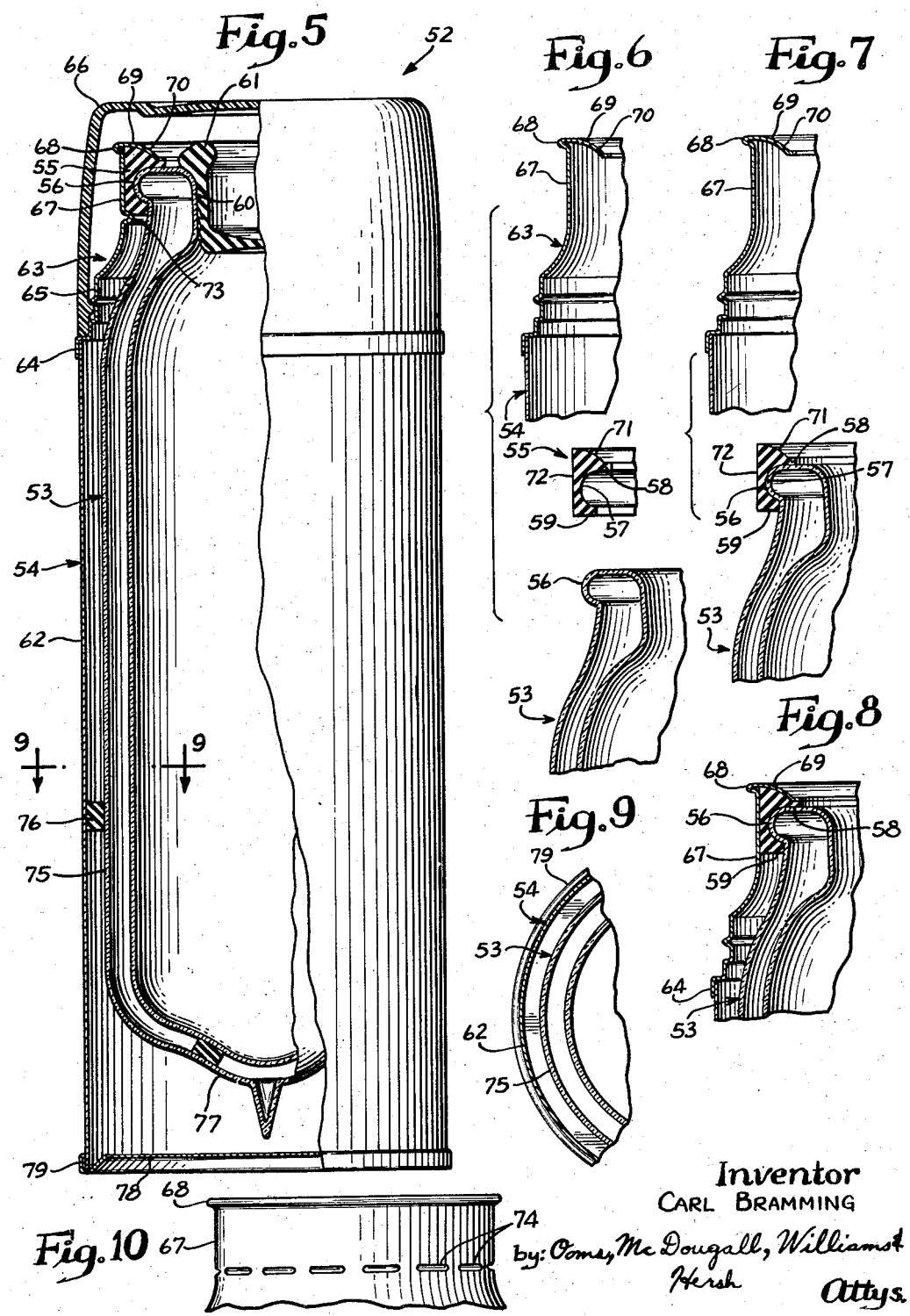

2,880,899
Patented Apr. 7, 1959

2,880,899

VACUUM BOTTLES WITH SUSPENDED FILLERS

Carl Bramming, Nashville, Tenn., assignor to Aladdin Industries, Incorporated, Nashville, Tenn., a corporation of Illinois Application September 10, 1956, Serial No. 608,963

4 Claims. (Cl. 215—13)

This invention relates to vacuum bottles of the type having a vacuum insulated filler received within a protective jacket made of metal, plastics or the like.

One principal object of the present invention is to provide a new and improved vacuum bottle in which the vacuum insulated filler is protected from breakage to a substantially greater extent than heretofore.

A further object is to provide a new and improved vacuum bottle in which the filler is suspended by its upper end from the upper end of the protective jacket.

Another object is to provide such a new and improved vacuum bottle in which the bottom of the filler is spaced from and out of engagement with the jacket, and hence is not subject to breakage.

It is a further object to provide a new and improved vacuum bottle in which the filler is mounted within the jacket in such a manner as to be protected from shock to a greater extent than heretofore.

A further object is to provide such a new and improved vacuum bottle which is constructed so as to tolerate greater variations in the length of the filler than heretofore.

Another object is to provide a new and improved vacuum bottle of the foregoing character which may be made at an extremely low cost.

A further object is to provide a new and improved vacuum bottle of the foregoing character that will incorporate the advantages of a pouring lip.

Further objects and advantages of the present invention will appear from the following description, taken with the accompanying drawings, in which:

Fig. 1 is an elevational view, partly in longitudinal section, of a vacuum bottle constituting one illustrative embodiment of the present invention.

Figs. 2, 3 and 4 are fragmentary sectional exploded views showing successive stages in the assembly of the vacuum bottle of Fig. 1.

Fig. 5 is an elevational view, partly in longitudinal section, of a modified vacuum bottle, constituting a second illustrative embodiment of the present invention.

Figs. 6 and 7 are fragmentary sectional exploded views showing successive stages in the assembly of the vacuum bottle of Fig. 5.

Fig. 8 is a fragmentary longitudinal sectional view showing the vacuum bottle of Fig. 5 with the parts fully assembled, but prior to the formation of a flange or bead means to retain the parts in assembled relation.

Fig. 9 is a fragmentary cross-sectional view, taken generally along a line 9—9 in Fig. 5.

Fig. 10 is a fragmentary elevational view, showing the upper end of a vacuum bottle similar to the vacuum bottle of Fig. 5, but representing a slight modification.

Figs. 1–4 will now be considered in greater detail. It will be seen that Fig. 1 illustrates a vacuum bottle 11 of the type comprising a vacuum insulated filler or receptacle 12 received within a protective jacket 13. The filler 12 has inner and outer walls 14 and 15 with an evacuated space 16 therebetween. At the lower end of the outer wall 15, the filler 12 has a sealed tubulation 17 which results from the evacuating operation. This tubulation is especially fragile and must be protected against breakage.

It will be noted that the filler 12 is suspended by its upper end from the upper end of the jacket 13. The connection between the filler 12 and the jacket 13 is established by an annular gasket 18 made of soft resilient material, such as plastic, synthetic rubber or the like. The gasket 18 interlocks with both the filler 12 and the jacket 13, with the result that the filler 12 is securely retained against movement with respect to the jacket.

It will be seen that the upper end of the filler 12 is formed with an outwardly projecting annular flange or bead 19. As illustrated, the bead 19 is of rounded form. Internal flange elements 20 and 21 are provided on the gasket 18 to retain the bead 19. An annular groove 22 of rounded form is defined between the flanges 20 and 21 to receive the bead 19. The gasket 18 is sufficiently flexible to permit the gasket to be mounted on and removed from the filler 12 when the gasket is separated from the jacket 13. It will be appreciated that it is necessary to stretch the gasket 18 to some extent in mounting it on and removing it from the filler 12.

It will be seen that the jacket 13 has a substantially cylindrical body portion 23. Above the body portion 23 is a slightly reduced portion 24 having external threads 25 or the like adapted to receive mating threads 26 on a cap 27, which also serves as a drinking cup. A tapering portion 28 surmounts the threaded portion 24 on the jacket 13. It will be seen that the upper end of the jacket 13 in the illustrated vacuum bottle is formed into a reduced, generally cylindrical portion 29.

To retain the gasket 18, the upper end portion 29 of the jacket 13 is formed with an outwardly projecting flange 30, adapted to interlock with flanges 31 and 32 on the gasket. The flange 31 overlies the flange 30 and extends outwardly and upwardly at the upper end of the gasket 18. At its outer edge, the flange 31 provides an outwardly projecting annular pouring lip 33 which overhangs the remainder of the gasket and tends to prevent liquid from dripping or running down the side of the jacket 13, when the liquid is poured out of the filler 12. The flange 31 has a smooth upper surface 34 which flares outwardly and upwardly to promote the smooth flow of the fluid toward the pouring lip 33. The engagement of the upper end of the filler 12 with the inside of the gasket 18 prevents the liquid from leaking downwardly into the space between the filler and the jacket 13.

In this case, the flange 32 is adapted to engage the underside of the flange 30 on the jacket 13. The flange 32 is sufficiently flexible to permit the gasket 18 to be mounted on and removed from the flange 30. It will be seen that the illustrated flange 32 is generally L-shaped in cross-section. It has a portion 35 which extends downwardly from the underside of the flange 31. A second portion 36 projects inwardly from the portion 35. Thus, an annular groove 37 of inverted L-shaped form is defined between the flange 32 and the remainder of the gasket 18. The groove 37 is of a form to receive the flange 30 with a snug fit.

It will be seen that the illustrated jacket 13 has an inwardly projecting flange or bead 38 whch is engageable with a downwardly facing shoulder 39 on the gasket 18. A reduced lower portion 40 on the gasket 18 is adapted to be received within the flange or bead 38. Above the reduced portion 40 is a body portion 41 which fits within the cylindrical upper end portion 29 of the jacket 13.

In this case, the jacket 13 has a bottom opening 42 provided with a removable closure 43. While the closure 43 may be of various forms, it is illustrated as a disk-like member 44 having an upwardly extending, generally cylindrical flange 45 adapted to be received within the bottom opening 42. Suitable means may be provided to retain the closure 43 on the jacket 13. In this instance, threadlike locating grooves or channels 46 are embossed into the outside of the flange 45 and are adapted to receive mating internal projections 47 on the cylindrical wall 23 of the jacket 13. The closure 43 may be removed by rotating it slightly and withdrawing it downwardly.

It will be seen that the upper end of the filler 12 is formed with a mouth 48 adapted to receive a suitable stopper 49 or the like. The outer wall 15 of the filler 12 has a substantially cylindrical side wall portion 50 which is spaced inwardly from the cylindrical body wall 23 of the jacket 13. One or more spacers are provided between the filler and the cylindrical wall 23 of the jacket 13 to prevent lateral movement of the filler. In this instance, a single spacer ring 51 is employed. The ring 51 is made of soft resilient material such as rubber, synthetic rubber, felt or plastic. The ring 51 may be cemented in place within the jacket 13.

Figs. 2, 3 and 4 illustrate successive stages in the assembly of the vacuum bottle 11, which is shown in the fully assembled state in Fig. 1. With the bottom closure 43 removed from the jacket 13, the filler 12 is inserted upwardly into the jacket 13 through the bottom opening 42. The filler 12 is passed upwardly until its upper end extends beyond the upper end of the jacket 13, as shown in Fig. 3. In this regard, it will be noted that the outside diameter of the flange 19 at the upper end of the filler 12 is less than the smallest inside diameter of the jacket 13, so that the upper end of the filler can pass entirely through the jacket from bottom to top.

With the upper end of the filler 12 projecting beyond the upper end of the jacket 13, the gasket 18 is mounted on the upper end of the filler. In this case, the gasket 18 must be stretched slightly so that the flange 21 at the lower end of the gasket will pass over the flange 19 at the upper end of the filler. The gasket 18 is sufficiently flexible and elastic to permit such mounting of the gasket on the filler. Fig. 4 shows the gasket in its mounted position, with the flange 19 seated in the groove 22 in the gasket.

Next, the filler 12 is moved downwardly to bring the gasket 18 into engagement with the jacket 13. The flange 32 is flexed downwardly and outwardly so that it will pass around the flange 30 on the upper end of the jacket 13. When the gasket flange 32 is released, it moves under the jacket flange 30. Thus, the jacket flange 30 is confined between the flanges 31 and 32 on the gasket 18, when the jacket and the gasket are in their fully assembled relation, as shown in Fig. 1. The assembly of the vacuum bottle 11 is completed by mounting the bottom closure 43 on the jacket 13.

It is a simple matter to remove the filler 12 for cleaning or replacement. To remove the filler, the bottom closure 43 is first removed from the jacket 13. The gasket 18 is then separated from the jacket 13 by flexing the flange 32 downwardly and outwardly so that it will pass upwardly around the flange 30 on the jacket. When the gasket 18 has been separated from the jacket, it is a simple matter to stretch the gasket sufficiently so that it may be removed from the upper end of the filler 12. The filler may then be withdrawn from the jacket 13 through the bottom opening 42.

The interlocking engagement between the flange 30 and the gasket 18 prevents relative movement between the gasket and the jacket 13. Moreover, the inwardly projecting flange or bead 38 on the jacket cooperates with the shoulder 39 to resist downward movement of the gasket 18. The flange 38 also retains the lower gasket portion 40 against the filler 12, so that the flange 19 on the filler will not become disengaged from the groove 22 in the gasket, when the gasket is engaged with the jacket. The interlocking flange elements 19, 20 and 21 on the filler 12 and the gasket 18 are effective to retain the filler against axial movement with respect to the gasket and the jacket. Of course, the gasket 18 also prevents relative lateral movement between the upper end portions of the filler 12 and the jacket 13. The spacing ring 51 maintains the filler 12 in spaced, centered relation to the side wall portion 23 of the jacket 13. Thus, the spacer 51 prevents lateral movement of the lower portion of the filler 12.

It wll be noted that the bottom of the filler 12 is spaced from and out of engagement with the jacket 13. This arrangement virtually eliminates any possibility that the bottom of the filler will be broken. The fragile tubulation 17 is effectively protected against damage.

The interlocking elements on the gasket and the filler effectively prevent the filler from being displaced axially, even when the vacuum bottle is subjected to great shock. Moreover, the suspension of the filler by the gasket is such that there is very little possibility that the filler will be broken at its suspended upper end when the vacuum bottle is subjected to shock. Thus, the vacuum bottle will stand much greater shock than will one of the conventional vacuum bottles in which the filler is supported at the bottom.

Since the bottom of the filler 12 is entirely free and out of engagement with the jacket 13, the length of the filler 12 may vary considerably without any adverse effect. Any variation in the length of the filler will merely change the spacing between the bottom of the filler of the bottom closure 43, without affecting the suspension of the filler. It has been found that substantial variations in the length of the filler are likely to occur in mass production of the filler. This has presented a problem in the conventional type of vacuum bottle in which the filler is compressed between the gasket at the upper end of the filler and a supporting member interposed between the bottom of the filler and the bottom of the jacket. In such conventional vacuum bottles, it is generally necessary to introduce an element of adjustability to compensate for variations in the length of the filler. In the construction of the present invention, however, wide variations in the length of the filler are of no consequence and can be tolerated without any need for adjustment.

The pouring lip 33 on the gasket 18 largely prevents the liquid contents of the filler 12 from running or dripping down the side of the vacuum bottle when the contents are poured out. In addition, the flaring upper surface 34 of the gasket 18 promotes smooth outward flow of the liquid from the filler 12. Furthermore, the gasket 18 prevents any liquid from leaking into the space between the filler 12 and the jacket 13.

The vacuum bottle 11 is highly resistant to shock and hence is especially well adapted to withstand being dropped by a parachute from an airplane. The dropping of supplies from the air to troops in the field is now a commonplace military operation. The vacuum bottles of the present invention may be employed to hold hot or cold food or beverages to be dropped from the air. In this way, highly palatable and nutritious food and beverages may be provided for troops in situations in which it is inconvenient, undesirable or impossible to set up field kitchens or to bring in supplies on the ground.

Figs. 5–10 illustrate another, somewhat modified vacuum bottle 52 which is also highly resistant to shock and hence is especially suitable for being dropped from the air. Moreover, the vacuum bottle 52 is extremely low in cost and hence may be treated as an expendable item in military operations.

It will be seen that the vacuum bottle 52 is similar to the vacuum bottle 11 in many respects. Thus, the vacuum bottle 52 comprises a filler 53 suspended by its upper end from the upper end of a protective jacket 54. A soft resilient gasket 55 is employed to connect the upper end of the filler 53 to the upper end of the jacket 54. The gasket 55 may be made of rubber, plastics or the like.

It will be seen that the filler 53 and the gasket 55 have interlocking flange elements which retain the filler against axial movement. Thus, the filler 53 has an outwardly projecting, annular flange 56 at its upper end. A groove 57 is formed in the inside of the gasket 55 to receive the flange 56 on the filler 53. The groove 57 is bounded by upper and lower flange elements 58 and 59 which are adapted to retain the flange 56 on the filler. As before, the upper end of the filler 53 is formed with mouth 60 adapted to receive a stopper 61 or some other closure.

The illustrated jacket 54 has a substantially cylindrical side wall portion 62 which is surmounted by an upper portion or collar 63. In this case, the collar 63 is formed as a separate piece, although it might be formed integrally with the cylindrical portion 62 as in the embodiment of Fig. 1. The collar 63 has a lower marginal portion 64 which is soldered, crimped or otherwise secured to the cylindrical side wall 62.

Above the lower margin 64, the collar 63 has an externally threaded portion 65 which is adapted to receive an internally threaded cap 66. It will be seen that the collar 63 tapers upwardly to a reduced, generally cylindrical upper portion 67, within which the gasket 55 is received. At the upper end of the cylindrical portion 67, the collar 63 is formed outwardly into a flange or bead 68 which provides an annular pouring lip, adapted to prevent any liquid from running or dripping down the side of the vacuum bottle when the liquid is poured out of the filler 53. An inwardly projecting flange 69 extends inwardly and downwardly from the pouring lip 68. The flange 69 has a smooth outwardly flaring upper surface 70 which promotes the smooth flow of liquid from the filler 53 to the pouring lip 68. It will be seen that the upper internal flange 58 on the gasket 55 is disposed between the flange 69 and the upper end of the filler 53. The upper end of the gasket 55 is formed with a surface 71 which fits snugly under the flange 69 on the collar 63.

In this instance, the gasket 55 has a substantially cylindrical outer surface 72 which is adapted to fit closely within the cylindrical upper portion 67 of the collar 63. Inwardly formed bead or flange means 73 are provided on the collar 63 to engage the bottom of the gasket 55 so that the gasket will be retained between the flanges 69 and 73. The flange 73 also prevents the lower internal flange 59 on the gasket 55 from being displaced outwardly. Thus, the flange 73 tends to prevent the filler 53 from becoming disengaged from the gasket 55.

In Fig. 5, the flange 73 is shown as a continuous internal bead. Fig. 10 illustrates modified flange means 74, in the form of a plurality of spaced, inwardly formed segmental flanges or beads.

The filler 53 has a cylindrical side wall portion 75 which is spaced away from the cylindrical wall 62 of the jacket 54 by a soft resilient annular spacing ring 76, or some other suitable spacing means. The spacer 76 prevents relative lateral movement between the jacket 54 and the lower portion of the filler 53. It will be seen that the filler 53 has a bottom portion 77 which is spaced and free from the jacket 54. The bottom of the jacket 54 is closed by a disk-like bottom member 78 having a peripheral portion 79 which is crimped, soldered or otherwise secured to the lower end of the cylindrical side wall 62. The bottom member 78 might be made removable, if desired.

Figs. 6, 7 and 8 show successive stages in the assembly of the vacuum bottle 52. It will be noted that the collar 63 is formed initially without the bead or flange 73, or the modified flange element 74. Moreover, the bottom member 78 is separated from the side wall 62 of the jacket 54. The first step in the assembly is to mount the gasket 55 on the upper end of the filler 53. This is done by stretching the gasket slightly so that the internal flange 59 will pass around the external flange 56 on the filler 53. Fig. 7 shows the gasket 55 mounted on the filler 53, with the flange 56 seated in the groove 57.

Next, the filler 53 is inserted upwardly into the jacket 54 until the gasket 55 passes into the cylindrical upper portion 67 of the collar 63 and engages the underside of the flange 69. This position of the gasket is shown in Fig. 8. The bead or flange 73 is formed with the gasket 55 and the filler 53 in place within the collar 63. It will be understood that the bead 73 may be formed by applying a suitable forming roller or other tool to the outside of the collar 63. Once the bead 73 is formed, the gasket 55 and the filler 53 are retained against axial movement relative to the jacket 54. The assembly is completed by mounting the bottom member 78 on the jacket. Since the vacuum bottle 52 is to be considered expendable, it is not necessary to make any provision for replacing the filler 53 in the event of breakage. In any event, breakage of the filler 53 will be unlikely, because of the shock resisting manner in which the filler is suspended by its upper end. The entire construction is especially serviceable and low in cost.

The spaced flange elements 74 may be formed in the collar 63 instead of the continuous bead 73. It generally will be found that the spaced, segmental flanges or embossments 74 will be easier to form than the continuous bead 73.

Various other modifications, alternative constructions and equivalents may be provided without departing from the true spirit and scope of the invention, as exemplified in the foregoing description and defined in the following claims.

I claim:

1. In a vacuum bottle, the combination comprising a vacuum insulated receptacle, a protective jacket received therearound, and a soft resilient annular gasket disposed between the upper ends of said jacket and said receptacle for suspending said receptacle by its upper end from the upper end of said jacket, said gasket having an upper end portion defining an upwardly and outwardly projecting annular pouring lip, said lip having a generally L-shaped flange on its underside and projecting downwardly and inwardly to define an annular groove extending upwardly and outwardly into the outside of said gasket, said jacket having an upper end portion with an outwardly projecting flange removably received in said groove for resisting relative axial movement of said jacket and said gasket, said receptacle having an upper end portion with an outwardly projecting flange thereon, said gasket having an internal groove receiving said flange on said receptacle and resisting relative axial movement of said receptacle and said gasket.

2. In a vacuum bottle, the combination comprising a vacuum insulated receptacle, a protective jacket received therearound, and a soft resilient annular gasket disposed between the upper ends of said jacket and said receptacle for suspending said receptacle by its upper end from the upper end of said jacket, said gasket having an upper end portion defining an upwardly and outwardly projecting annular pouring lip, said lip having a generally L-shaped flange on its underside and projecting downwardly and inwardly to define an annular groove extending upwardly and outwardly into the outside of said gasket, said jacket having an upper end portion with an outwardly projecting flange removably received in said groove for resisting relative axial movement of said jacket and said gasket, said receptacle having an upper end portion with an outwardly projecting flange thereon, said gasket having an internal groove receiving said flange on said receptacle and resisting relative axial movement of said receptacle and said gasket, said receptacle having a bottom opening with a closure removably secured to said jacket to close said opening, said receptacle being removable through said bottom opening after separating said gasket from said jacket and said receptacle, said gasket being resiliently flexible to provide for such separation.

3. In a vacuum bottle, the combination comprising a vacuum insulated receptacle, a protective jacket received therearound, and a soft resilient annular gasket disposed between the upper ends of said jacket and said receptacle for suspending said receptacle by its upper end from the upper end of said jacket, said gasket having an upper end portion defining an outwardly projecting annular flange, said flange having a generally L-shaped flange portion on its under side and projecting downwardly and inwardly to define an annular groove extending upwardly and outwardly into the outside of said gasket, said jacket having an upper end portion with an outwardly projecting flange removably received in said groove for resisting relative axial movement of said jacket and said gasket, said receptacle having an upper end portion with an outwardly projecting flange thereon, said gasket having an internal groove receiving said flange on said receptacle and resisting relative axial movement of said receptacle and said gasket.

4. In a vacuum bottle, the combination comprising a vacuum insulated receptacle, a protective jacket received therearound, and a soft resilient annular gasket disposed between the upper ends of said jacket and said receptacle for suspending said receptacle by its upper end from the upper end of said jacket, said gasket having an upper end portion defining an outwardly projecting annular flange, said flange having a generally L-shaped flange portion on its under side and projecting downwardly and inwardly to define an annular groove extending upwardly and outwardly into the outside of said gasket, said jacket having an upper end portion with an outwardly projecting flange removably received in said groove for resisting relative axial movement of said jacket and said gasket, said receptacle having an upper end portion with an outwardly projecting flange thereon, said gasket having an internal groove receiving said flange on said receptacle and resisting relative axial movement of said receptacle and said gasket, said receptacle having a bottom opening with a closure removably secured to said jacket to close said opening, said receptacle being removable through said bottom opening after separating said gasket from said jacket and said receptacle, said gasket being resiliently flexible to provide for such separation.

References Cited in the file of this patent
UNITED STATES PATENTS

| | | |
|---|---|---|
| 922,125 | Friedrich | May 18, 1909 |
| 1,779,117 | Davis | Oct. 21, 1930 |
| 1,963,162 | Whipple | June 19, 1934 |
| 2,163,056 | Payson et al. | June 20, 1939 |
| 2,207,543 | Knapp | July 9, 1940 |
| 2,591,151 | Hansen et al. | Apr. 1, 1952 |
| 2,613,837 | Morton | Oct. 14, 1952 |
| 2,756,889 | Bramming | July 31, 1956 |
| 2,771,754 | Winkler | Nov. 27, 1956 |

UNITED STATES PATENT OFFICE
CERTIFICATE OF CORRECTION

Patent No. 2,880,899                                                    April 7, 1959

Carl Bramming

It is hereby certified that error appears in the printed specification of the above numbered patent requiring correction and that the said Letters Patent should read as corrected below.

Column 5, line 15, before "mouth" insert -- a --; column 8, line 13, for "receptacle" read -- jacket --.

Signed and sealed this 28th day of July 1959.

(SEAL)

Attest:

KARL H. AXLINE
Attesting Officer

ROBERT C. WATSON
Commissioner of Patents